(12) United States Patent
Chen (10) Patent No.: US 7,958,449 B2
(45) Date of Patent: Jun. 7, 2011

(54) METHOD AND APPARATUS FOR DISPLAYING AND PROCESSING INPUT FIELDS FROM A DOCUMENT

(75) Inventor: Yen-Fu Chen, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 2691 days.

(21) Appl. No.: 10/612,456

(22) Filed: Jul. 2, 2003

(65) Prior Publication Data

US 2005/0005234 A1    Jan. 6, 2005

(51) Int. Cl.
*G06F 3/00* (2006.01)
(52) U.S. Cl. ........ 715/709; 715/507; 715/779; 715/789; 715/517
(58) Field of Classification Search .......... 715/505–508, 715/700, 760, 780, 829, 779, 789, 764–768, 715/717, 709, 711, 712
See application file for complete search history.

(56) References Cited

U.S. PATENT DOCUMENTS

| | | | | |
|---|---|---|---|---|
| 5,041,967 | A | 8/1991 | Ephrath et al. | 364/200 |
| 5,325,478 | A * | 6/1994 | Shelton et al. | 715/507 |
| 5,495,567 | A | 2/1996 | Iizawa et al. | 395/161 |
| 5,905,494 | A | 5/1999 | Krosner et al. | 345/335 |
| 6,247,047 | B1 | 6/2001 | Wolff | 709/219 |
| 6,882,981 | B2 * | 4/2005 | Philippe et al. | 705/26 |
| 2004/0073868 | A1 * | 4/2004 | Easter et al. | 715/507 |
| 2004/0205530 | A1 * | 10/2004 | Borg | 715/507 |
| 2004/0215467 | A1 * | 10/2004 | Coffman et al. | 705/1 |

* cited by examiner

Primary Examiner — Simon Ke
(74) Attorney, Agent, or Firm — Tee & Associates, P.C.; Mark C. Vallone (57) ABSTRACT

A method, apparatus, and computer instructions for presenting input fields from a document. A selected indicator associated with a set of mandatory input fields in the document is identified. The set of mandatory input fields is presented. Further, the mandatory input fields may be pre-filled using data from a repository associated with a user.

21 Claims, 5 Drawing Sheets

Profile Information

Help

| | | |
|---|---|---|
| First Name | [________________] | ~502 |
| Last Name | [________________] | ~504 |

Your first and last names will be sent with all outgoing e-mail messages.

| | | |
|---|---|---|
| Country / Region | United States ▼ | ~508 |
| State | [Choose One] ▼ | ~510 |
| ZIP Code | [________________] | ~512 |
| Gender | ○ Male   ○ Female | ~516 |
| Birth Date | Month ▼  Day ▼  [____] (ex. 1999) | ~518 |

METHOD AND APPARATUS FOR DISPLAYING AND PROCESSING INPUT FIELDS FROM A DOCUMENT

BACKGROUND OF THE INVENTION

1. Technical Field

The present invention relates generally to an improved data processing system and in particular, a method and apparatus for processing data. Still more particularly, the present invention provides a method, apparatus, and computer instructions for processing input fields in a Web page.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

When a user visits a Website, the user is often asked to register with the Website by filling in a form. Further, the user also fills in forms when purchasing items from different Websites. Typically, a Web page is sent to the user in which a number of different input fields are present. These input fields may require the user to input data or to select data from a list of selections. Many of these forms have numerous fields in which some of the input fields are optional while other input fields are mandatory. If the user does not fill in all of the mandatory input fields, the process typically returns a message to the user indicating that one or more of the mandatory input fields have not been filled in by the user.

Identifying mandatory input fields also may be difficult with the number of input fields that are presented to the user. Currently, many Web pages identify mandatory input fields by bolding the label next to the input field or by placing a graphical indicator, such as a "*", next to the field. These types of indicators are not sufficiently obvious to allow a user to quickly identify all of the mandatory input fields.

Therefore, it would be advantageous to have an improved method, apparatus, and computer instructions for presenting mandatory input fields to a user.

SUMMARY OF THE INVENTION

The present invention provides a method, apparatus, and computer instructions for presenting input fields from a document, such as a Web page. A selected indicator associated with a set of mandatory input fields in the document is identified. The set of mandatory input fields is presented. Further, the mandatory input fields may be pre-filled using data from a repository associated with a user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
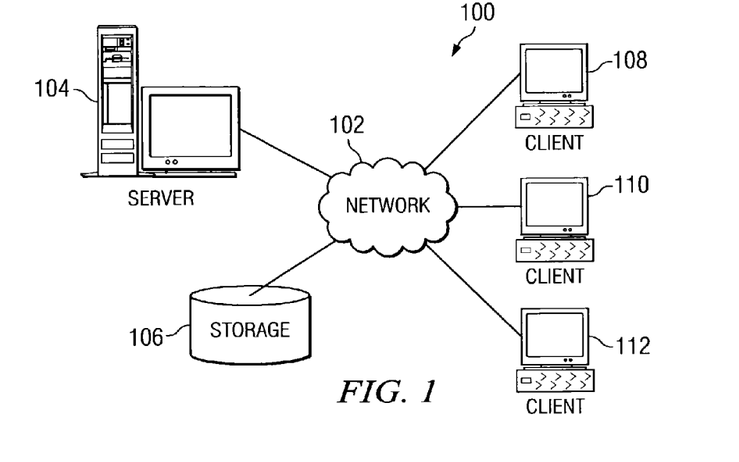
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
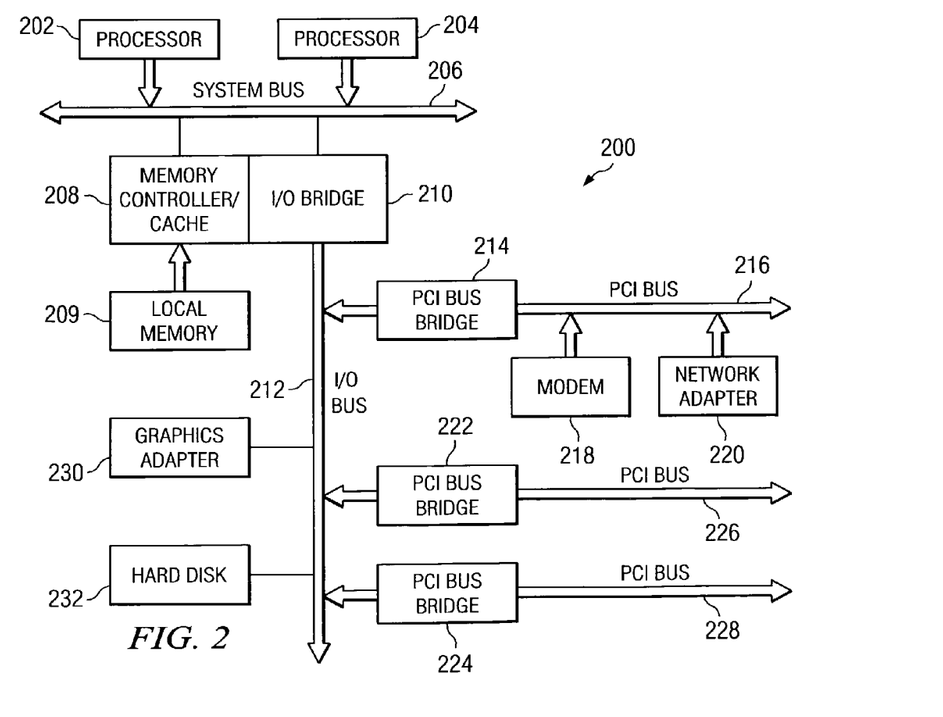
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
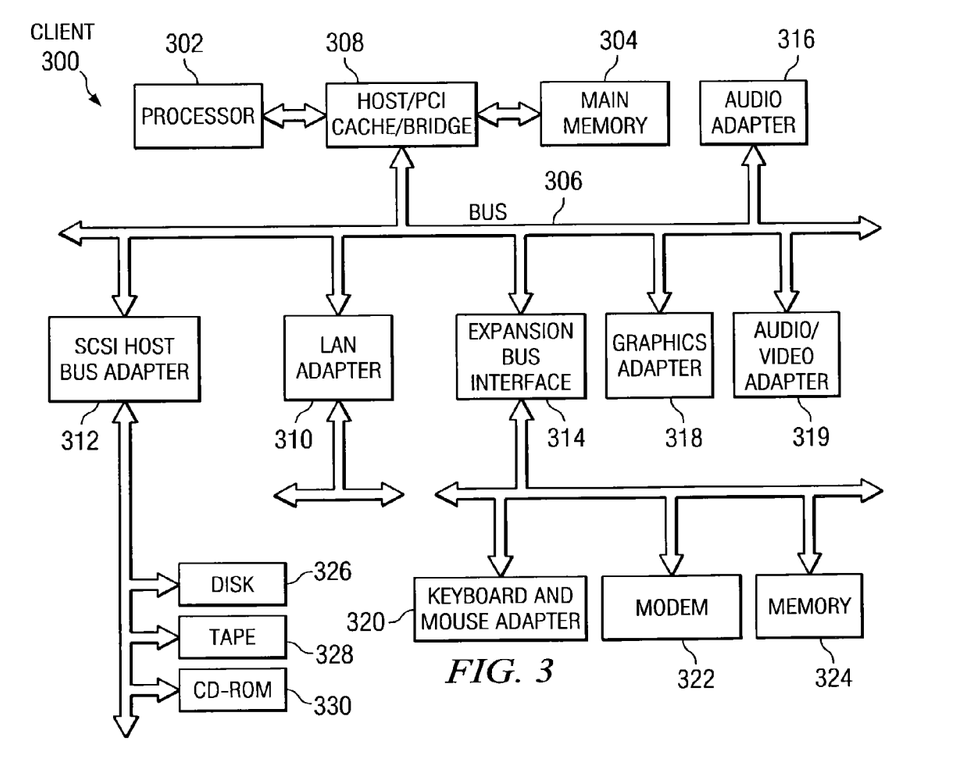
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for presenting mandatory input fields in a document. In these examples, the document is a Web page in HTML. The source of the Web page containing the HTML statements is parsed to identify mandatory input fields. The page is re-rendered or a pop-up window is presented in which the mandatory fields are displayed. In addition, the mechanism of the present invention also allows for pre-filling of data to occur. Data needed for various input fields may be stored.

This data is then inserted into the mandatory or optional input fields when these fields are presented to the user. This additional feature eliminates the need for a user to go to each field and input data.

Figure 4:
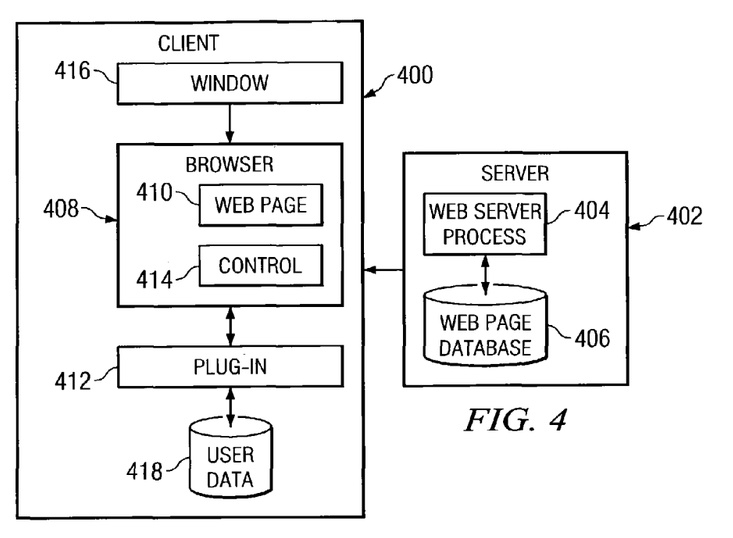
FIG. 4 is a diagram illustrating components used in presenting a filling input fields in accordance with a preferred embodiment of the present invention.

Tuning now to FIG. 4, a diagram illustrating components used in presenting and filling input fields is depicted in accordance with a preferred embodiment of the present invention. In this example, client 400 contacts server 402 to request a Web page. Requests are handled by Web server process 404 in server 402. This process retrieves a Web page from Web page database 406 and returns this Web page to browser 408 in client 400 for display.

As illustrated, Web page 410 is displayed in browser 408. Web page 410 includes a number of input fields to be filled in by a user. Plug-in 412 is provided as an auxiliary program to browser 408 to parse or filter the source for Web page 410. HTML statements form the source of Web page 410 in this example. Plug-in 412 looks for mandatory input fields by searching for an indicator, such as a tag in Web page 410. In these examples, HTML tags may be used to declare required and optional input fields. For example, the following format may be used for a required input field: <input type="" name="" REQ>. For an optional input field, the following may be used: <input type="" name="" OPT>. In addition, a following set of tags may be used: <Required>, </Required>.

If element/attribute declaration is not preferred, then a process using a pretest submission form with dummy data may be used to identify required and optional fields in the Web page. Additionally, a sequence of fields may be indicated to allow for a particular order in which the fields are presented. If a sequence of fields is desired, then tags, such as the following may be used: <req#>, </req#>. Also, a minimum number of characters required for these mandatory text fields also may be set.

This mandatory presentation feature of the present invention may be initiated through a control such as control 414 in browser 408. This control may be, for example, a button or other graphical control presented by browser 408. Control 414 may be presented in a tool bar. Alternatively, control 414 may be presented when a right button is selected on a mouse or through any other mechanism for initiating commands.

Upon initiation of this feature, plug-in 412 processes Web page 410 and may re-present Web page 410 with the mandatory or optional input fields, depending on the particular implementation and preference of the user. Further, as part of this presentation, standard fields associated with the input fields may be made available. These fields may include, for example, a text field, a text box, a radio button, and a check box.

Alternatively, instead of re-presenting Web page 410, window 416 may be presented to the user with the mandatory input fields. This form, window 416 includes the same form options as found in Web page 410 to allow a user to directly submit the information upon completing the mandatory fields. In such a case, the data input by the user in window 416 may be sent back to the original window in which Web page 410 is displayed. Then, a set of commands, such as form.submit( ) and window.close( ), may be initiated on window 416 to allow the user to proceed onto the next page that is presented after submission of data. The mechanism of the present invention also may provide for automatic submission of data after completion of mandatory fields in window 416. As another alternative, this data entered in window 416 may be transferred back to Web page 410 to allow the user to verify the data input into window 416, as well as allowing the user to fill in optional fields prior to submission of the data.

Data pre-fill is another feature provided by the mechanism of the present invention. Data may be stored in user data 418 or in some other local repository. When a Web page is presented with identical or similar data fields, plug-in 412 automatically inserts the data into the appropriate fields. For example, data, such as name, address, email address, and telephone number, may be pre-filled using this feature eliminating the need for the user to go to each field. User data 418 contains entries in which a piece of data, such as an-email address, is associated with an identifier for the input field. This identifier may be, for example, an HTML tag identifying the input field type.

This pre-fill feature may be initiated through control 414 in these examples. Alternatively, a tool bar with a control may be displayed in association with window 416 in which a user may select a control from this toolbar to initiate a pre-fill feature of the present invention. Through this control, a user may enter and save information to user data 418. Further, this feature may be automatically initiated based on the user visiting a particular Website or Web page. For example, the initiation of this feature may be based on an IP address, a URL, a domain name, or a title on a page. In this manner, the feature may be initiated when the user visits the same Web page. Plug-in 412 may track and store user information in user data 418. With this feature, plug-in 412 tracks data submitted from previous forms by examining the memory or cookies to identify information to be stored in user data 418. Plug-in 412 generates new entries in user data 418 from information identified from previous submissions. These entries each include some identifier of the field along with the user information. For example, a tag identifying an address field may be stored in association with address information by plug-in 412.

Additionally, plug-in 412 may be configured to allow a user to select different sets of information for a particular form. For example, different credit card information or a business address may be used depending on the particular requirement of the user.

Plug-in 412 also may present mandatory input fields in a particular sequence within window 416 if a particular sequence is identified by the indicators in Web page 410. Further, window 416 may display all required input fields or only required input fields that have not been filled.

Also, plug-in 412 may allow a user to toggle between optional fields and required fields. For example, a selection of control 414 results in the display of optional fields. Control 414 may take various forms such as a tool bar, a floating toolbar, or some other text or graphical indicator. Additionally, a movement of a pointer over control 414 may toggle a display of optional or required fields depending on the particular implementation.

Figure 5A:
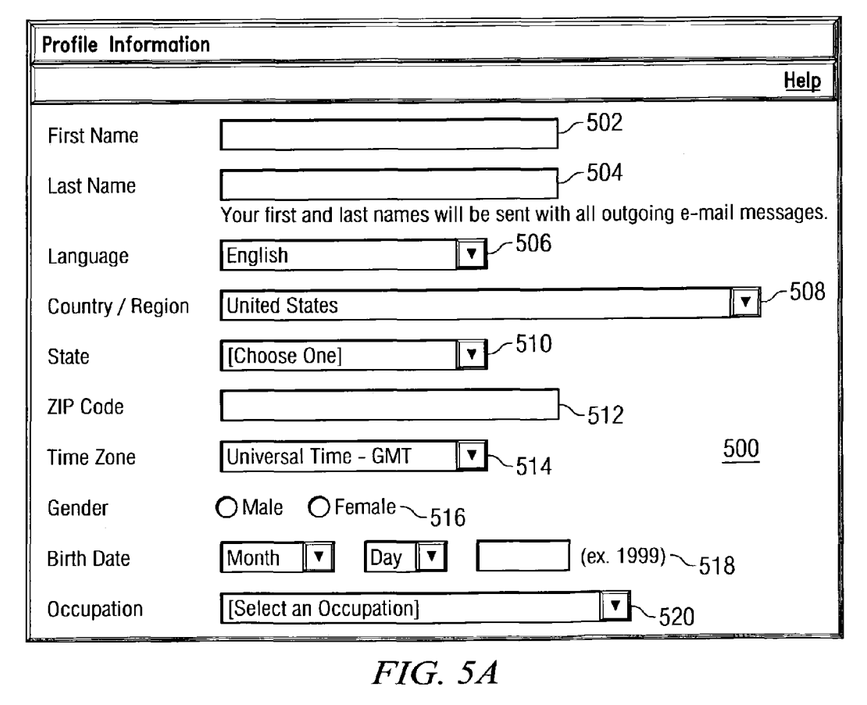
FIGS. 5A and 5B are diagrams illustrating input fields in accordance with a preferred embodiment of the present invention.
Figure 5B:
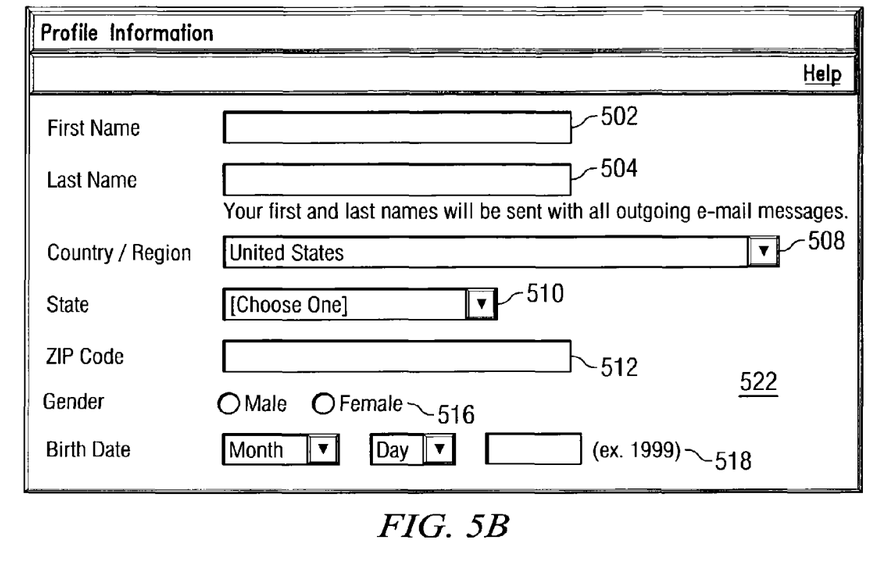

Turning next to FIGS. 5A and 5B, diagrams illustrating input fields are depicted in accordance with a preferred embodiment of the present invention. In this example, Web page 500 in FIG. 5A depicts input fields 502, 504, 506, 508, 510, 512, 514, 516, 518, and 520. Input fields 502, 504, 508, 510, 512, 516, and 518 are mandatory input fields. Input fields 506, 514, and 520 are optional input fields in Web page 500.

Web page 500 is processed to identify mandatory input fields, which are displayed in reformatted Web page 522 in FIG. 5B. Of course, these mandatory input fields could be presented to the user through a different mechanism, such as a pop-up window instead of as a new Web page.

Figure 6:
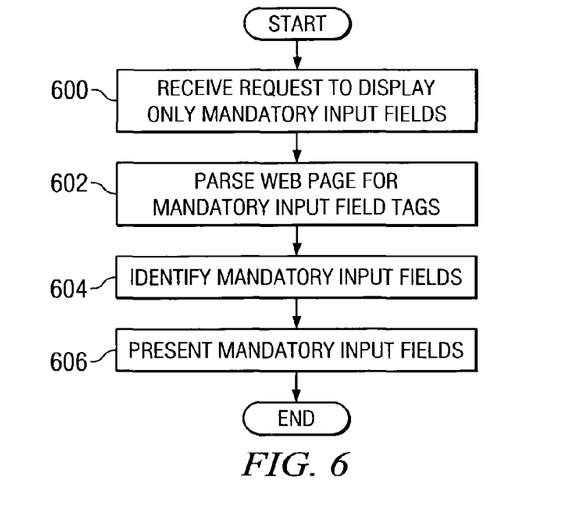
FIG. 6 is a flowchart of a process for processing a Web page with input fields in accordance with a preferred embodiment of the present invention.

Turning now to FIG. 6, a flowchart of a process for processing a Web page with input fields is depicted in accordance with a preferred embodiment of the present invention. The process illustrated in FIG. 6 may be implemented in a process such as plug-in 412 in FIG. 4.

The process begins by receiving a request to display only mandatory input fields (step 600). Next, the Web page is parsed for mandatory input tags (step 602). The mandatory input fields are identified from the tags (step 604). Next, the mandatory input fields are presented (step 606) with the process terminating thereafter.

As discussed above, these fields may be presented in any number of different ways depending on the particular implementation. For example, a reformatted Web page containing only the mandatory input fields may be displayed. Alternatively, the mandatory input fields may be presented in a window.

Figure 7:
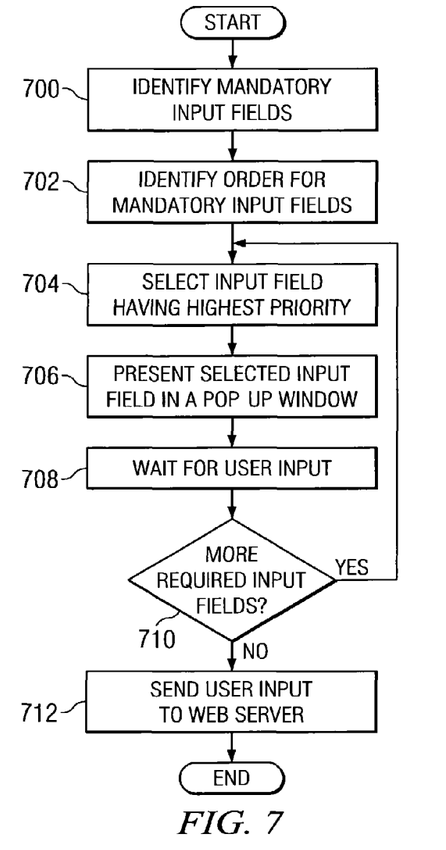
FIG. 7 is a flowchart of a process for sequentially displaying input fields in accordance with a preferred embodiment of the present invention.

Turning to FIG. 7, a flowchart of a process for sequentially displaying input fields is depicted in accordance with a preferred embodiment of the present invention. The process illustrated in FIG. 7 may be implemented in a process such a plug-in 412 in FIG. 4.

The process begins by identifying mandatory input fields (step 700). The step may be implemented by identifying special or selected tags in the source for a Web page. An order for the mandatory input fields is identified (step 702). This order may be indicated through tags, such as <req#>, </req#>. Next, the input fields having the highest priority are selected (step 704). This input field is then presented in a pop-up window (step 706). The process then waits for user input (step 708).

Upon receiving the user input, a determination is made as to whether more unprocessed mandatory input fields are present for processing (step 710). If more input fields are present, the process returns to step 704 as described above. Otherwise, the process sends the user input to the Web server (step 712) with the process terminating thereafter.

Figure 8:
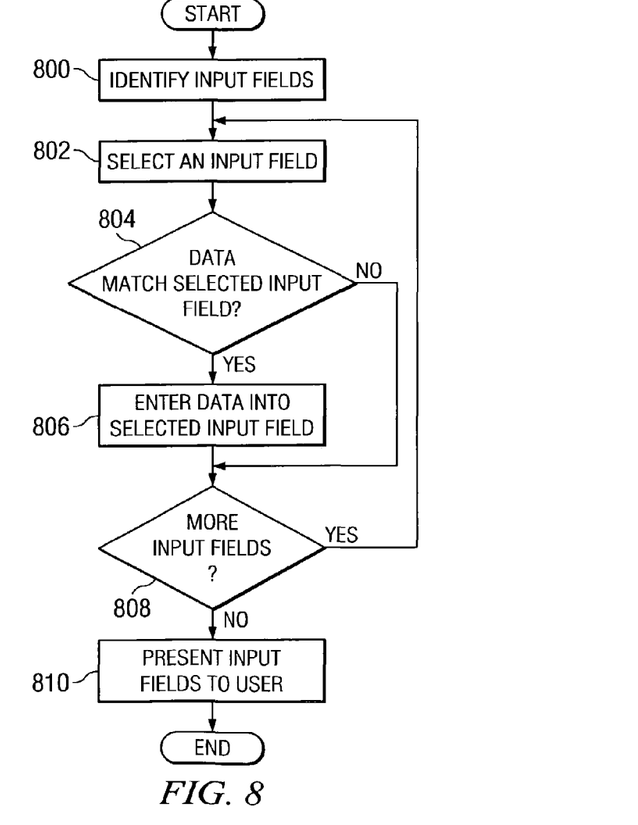
FIG. 8 is a flowchart of a process for pre-filling input fields in accordance with a preferred embodiment of the present invention.

With reference to FIG. 8, a flowchart of a process for pre-filling input fields is depicted in accordance with a preferred embodiment of the present invention. The process illustrated in FIG. 8 may be implemented in a process such as plug-in 412 in FIG. 4.

The process begins by identifying input fields (step 800). Next, an unprocessed input field is selected for processing (step 802). A determination is made as to whether data in a local data store, such as user data 418 in FIG. 4 matches the selected input field (step 804). The matching of data to the input fields may be accomplished through various known processes. For example, the data may be indexed based on tags. A determination may be made as to whether the tag matches one of the indices. If a match is present, then the data is entered or pre-filled into the selected input field (step 806).

Thereafter, a determination is made as to whether additional unprocessed input fields are present (step 808). If additional unprocessed input fields are present, the process returns to step 802. Otherwise, the input fields, including the pre-filled data are presented to the user (step 810) with the process terminating thereafter. Turning back to step 804, if a match is not present, the process proceeds to step 808 as described above.

With respect to the steps for pre-filling data, an additional step may be included to allow a user to validate or confirm the data that has been pre-filled into the input fields. Additionally, this process may include a mechanism such as a graphical user interface to allow a user to manage data in a repository used to pre-fill input fields for the user.

Thus, the present invention provides an improved method, apparatus, and computer instructions for managing input fields. The mechanism of the present invention allows for the declaration of mandatory and optional input fields. This mechanism parses a Web page to identify mandatory input fields based on indicators in the Web page. These indicators may take different forms such as tags. These fields are then presented to the user. Additionally, optional fields may be identified and presented in the same manner as mandatory fields. With this mechanism, a user may easily identify fields that are required to be filled for a particular submission.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the depicted examples are illustrative using client-side processes, the mechanism of the present invention may be implemented in other locations. The process may be implemented on a server to which the user is connected. In addition, a command-line interface may be used to initiate the process for displaying mandatory fields and pre-filling. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for presenting input fields from a document, the method comprising:
   parsing the document to identify a selected indicator associated with a set of mandatory input fields in the document and presenting only the set of mandatory input fields.

2. The method of claim 1, wherein the presenting step comprises:
   displaying the set of mandatory input fields in a window.

3. The method of claim 1, wherein the presenting step comprises:
   reformatting the document to contain only the set of mandatory input fields.

4. The method of claim 1, wherein the presenting step comprises:
   presenting a first input field from the set of mandatory input fields; and
   responsive to information being entered in the first input field, presenting a second input field from the set of mandatory input fields.

5. The method of claim 1, wherein the indicator is a hypertext markup language tag.

6. The method of claim 1, wherein the document is a Web page.

7. The method of claim 1 further comprising:
determining whether any of the set of mandatory input fields correspond to pre-stored information; and
responsive to an input field within the set of mandatory input fields corresponding to pre-stored information, filling the input field within the set of mandatory input fields with the pre-stored information.

8. A data processing system for presenting input fields from a document, the data processing system comprising:
identifying means for identifying a selected indicator within a parsed document, the indictor being associated with a set of mandatory input fields in the document; and
presenting means for presenting only the set of mandatory input fields.

9. The data processing system of claim 8, wherein the presenting means comprises:
displaying means for displaying the set of mandatory input fields in a window.

10. The data processing system of claim 8, wherein the presenting means comprises:
reformatting means for reformatting the document to contain only the set of mandatory input fields.

11. The data processing system of claim 8, wherein the presenting means comprises:
first means for presenting a first input field from the set of mandatory input fields; and
second means for presenting a second input field from the set of mandatory input fields in response to information being entered in the first input field.

12. The data processing system of claim 8, wherein the indicator is a hypertext markup language tag.

13. The data processing system of claim 8, wherein the document is a Web page.

14. The data processing system of claim 8 further comprising:
determining means for determining whether any of the set of mandatory input fields correspond to pre-stored information; and
filling means for filling an input field within the set of mandatory input fields with the pre-stored information in response to the input field within the set of mandatory input fields corresponding to the pre-stored information.

15. A computer program product in a recordable-type medium for presenting input fields from a document, the computer program product comprising:
first instructions for parsing the document to identify a selected indicator associated with a set of mandatory input fields in the document; and
second instructions for presenting only the set of mandatory input fields.

16. The computer program product of claim 15, wherein the second instructions comprises:
sub-instructions for displaying the set of mandatory input fields in a window.

17. The computer program product of claim 15, wherein the second instructions comprises:
sub-instructions for reformatting the document to contain only the set of mandatory input fields.

18. The computer program product of claim 15, wherein the second instructions comprises:
first sub-instructions for presenting a first input field from the set of mandatory input fields; and
second sub-instructions for presenting a second input field from the set of mandatory input fields in response to information being entered in the first input field.

19. The computer program product of claim 15, wherein the document is a Web page.

20. The computer program product of claim 15 further comprising:
seventh instructions for determining whether any of the set of mandatory input fields correspond to pre-stored information; and
eighth instructions for filling an input field within the set of mandatory input fields corresponding to pre-stored information with the pre-stored information in response to the input field within the set of mandatory input fields corresponding to the pre-stored information.

21. A server data processing for obtaining cultural context information from a client, the server data processing system comprising:
a bus system;
a communications unit connected to the bus system;
a memory connected to the bus system, wherein the memory includes a set of instructions; and
a processing unit connected to the bus system, wherein the processing unit identifies a selected indicator associated with a set of mandatory input fields in the document and presents only the set of mandatory input fields, wherein the indicator is a hypertext markup language tag.

* * * * *